United States Patent Office 3,338,622
Patented Aug. 29, 1967

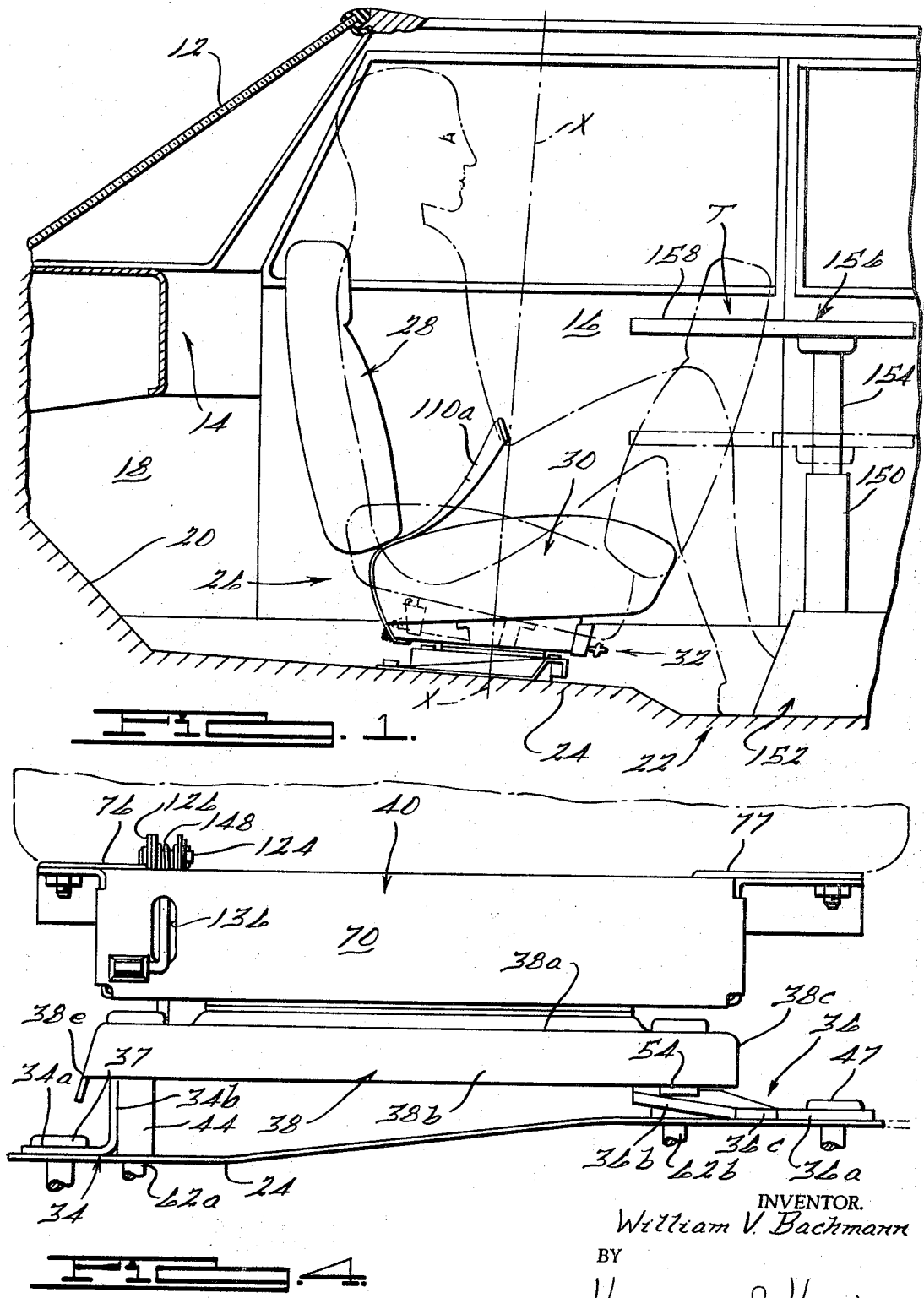

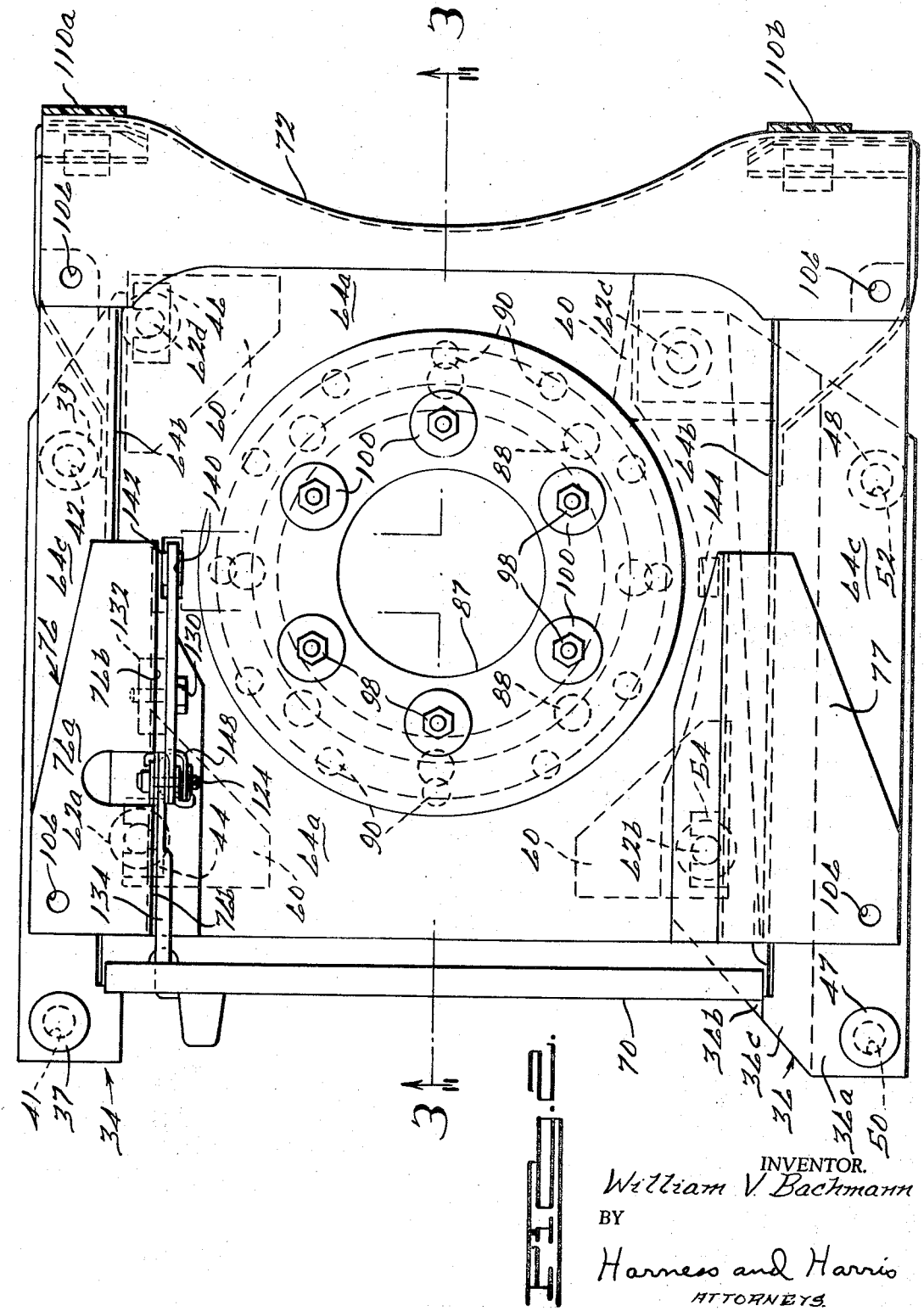

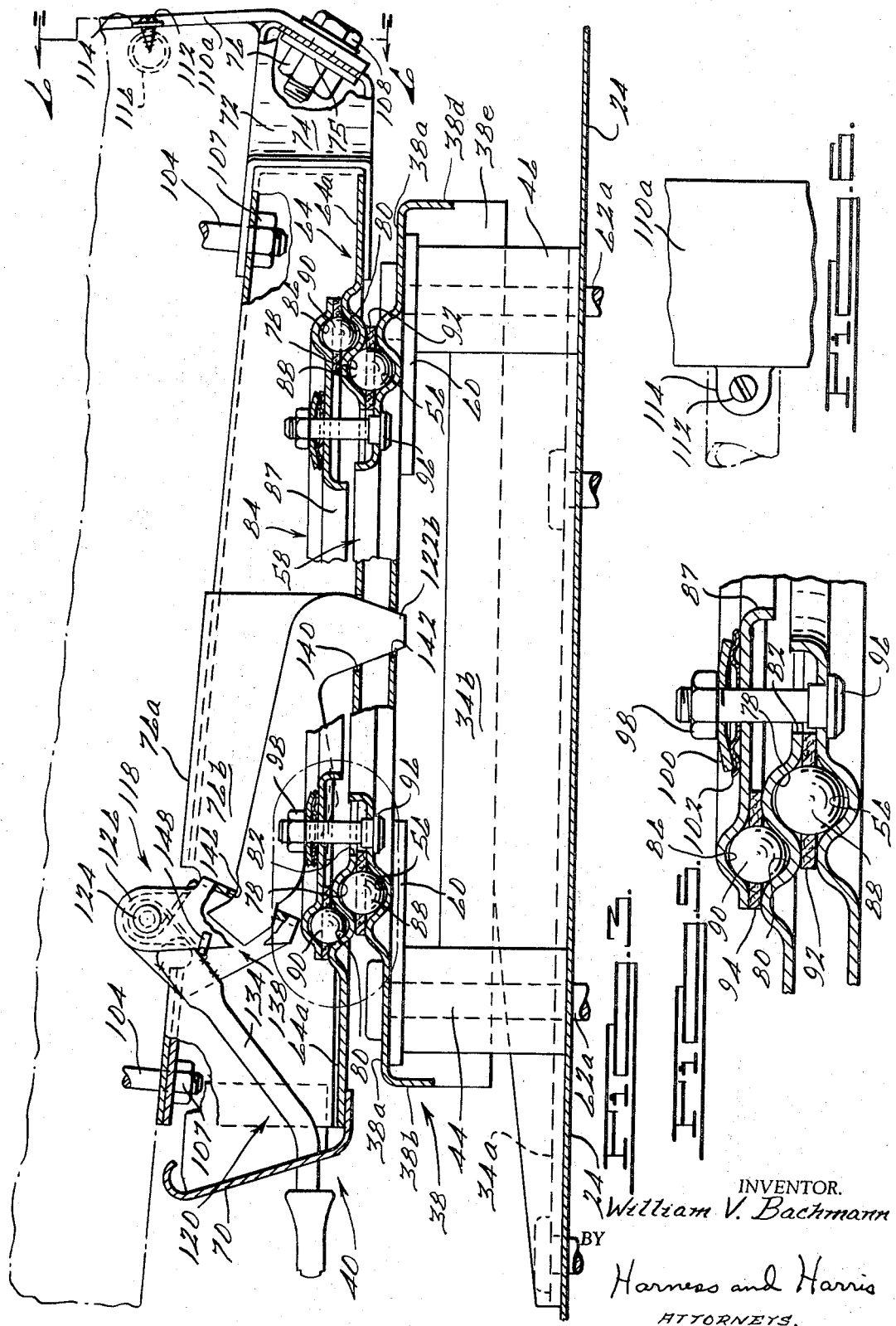

3,338,622
SWIVEL SEAT FOR MOTOR VEHICLE
William V. Bachmann, St. Clair Shores, Mich., assignor to Chrysler Corporation, Highland Park, Mich., a corporation of Delaware
Filed Dec. 8, 1965, Ser. No. 512,431
11 Claims. (Cl. 296—65)

This invention relates to a swivel seat for a motor vehicle.

It is an object of the present invention to provide an improved swivel seat for a motor vehicle.

A more specific object is to provide a swivel seat which is peculiarly adapted to serve as the front passenger seat of a motor vehicle.

These and other objects, features and advantages of the invention will be apparent from the following detailed description of a preferred embodiment of the invention and from the accompanying drawings in which:

FIG. 1 is a fragmentary sectional view of a motor vehicle embodying a swivel seat according to the invention;

FIG. 2 is a plan view of the swivel base structure of the swivel seat of FIG. 1;

FIG. 3 is a sectional view of the swivel base structure of FIG. 2 taken on line 3—3 of FIG. 2;

FIG. 4 is an end view of the swivel base structure of FIG. 2;

FIG. 5 is a view on an enlarged scale of the swivel base structure within the dotted circle of FIG. 3; and FIG. 6 is a fragmentary detail view looking in the direction of the arrow 6 in FIG. 3.

The motor vehicle seen fragmentarily in FIG. 1 includes a roof 10, a windshield 12, an instrument panel 14, a door 16, a cowl side panel 18, a toe board 20, and a floor pan 22 including a forward floor portion 24.

Forward floor portion 24 supports a swivel seat assembly 26 comprising the front passenger seat of the motor vehicle. Seat assembly 26 includes a seat back 28, a seat bottom 30, and a swivel base structure seen generally at 32.

Particular reference is now made to FIGS. 2, 3 and 4. Base structure 32 includes right and left adapter plates 34, 36, a lower stationary platform 38, and an upper swiveling platform 40.

Right adapter plate 34 includes a base portion 34a and an upstanding rib portion 34b. Bolts 37, 39 pass through holes 41, 42 in base portion 34a and through aligned, longitudinally spaced holes in floor portion 24 to secure adapter plate 34 to floor portion 24 in a position extending generally parallel to the longitudinal axis of the vehicle. Forward and rearward risers 44, 46 are welded to the inboard face of rib portion 34b.

Left adapter plate 36 includes a base portion 36a, a mounting portion 36b, and a twisted bridge portion 36c connecting base portion 36a and mounting portion 36b. Bolts 47, 48 pass through holes 50, 52 in base portion 36a and through aligned, longitudinally spaced holes in floor portion 24 to secure adapter plate 36 to floor portion 24 in a position extending generally parallel to adapter plate 34. A riser 54 is welded to the forward upper face of mounting portion 36b.

Lower platform 38 is a single piece structure comprising a generally rectangular and generally horizontal mounting portion 38a and skirt portions 38b, c, d and e depending integrally from the four sides of portion 38a to form therewith a downwardly opening, box-like structure.

Mounting portion 38a is radially crimped to form a lower annular ball bearing race 56. Portion 38a also includes a central lightening hole 58 concentrically within race 56. A reinforcing pad 60 is welded to the underface of mounting portion 38a adjacent the four corners of the latter and four studs 62a, b, c and d are welded to the four corners of portion 38a and project downwardly therefrom through aligned apertures in portion 38a and the underlying pads 60. Studs 62a, b and d pass through slots provided in risers 44, 46 and 54 and through holes in floor portion 24. Stud 62c passes directly through a locally elevated section of floor portion 24. Studs 62 are engaged beneath floor portion 24 by nuts to fixedly secure lower platform 38 to adapter plates 34, 36 and provide a firm foundation to receive upper swivelling platform 40.

Platform 40 includes a main plate 64, a front cover 70, and a rear cover 72. Plate 64 includes a generally rectangular and generally horizontal mounting portion 64a, side wall portions 64b upstanding from either longitudinal edge of mounting portion 64a, and raised wing portions 64c extending laterally outwardly from wall portions 64b.

Cover 70 is relatively thin gauge and is welded to the forward end of main plate 64; rear cover 72 comprises a relatively heavy gauge U-channel and is welded to the rearward end of main plate 64. The central section of the web portion 74 of channel 72 is bowed inwardly to provide additional rear seat foot room. Reinforcing plates 75 are welded to the inner face of web portion 74 at each end of the latter and nuts 76 are welded to reinforcing plates 75. A reinforcing angle bracket 76 is welded to one wing portion 64c and to the adjacent upper face of mounting portion 64a. Another angle bracket 77 is welded to the other wing portion 64c and to mounting portion 64a.

Mounting portion 64a is doubly crimped to form an upper annular ball bearing race 78 and a lower annular ball bearing race 80. Portion 64a also includes a central lightening hole 82.

Swivel base structure 32 also includes a disc 84. Disc 84 is radially crimped to provide an upper annular ball bearing race 86; disc 84 also includes a central lightening hole 87.

In the assembled relationship of the swivel base structure (best seen in FIG. 5), lower bearing race 56 of mounting portion 38a and upper bearing race 78 of mounting portion 64a are radially aligned to rollably receive therebetween a plurality of relatively large diameter steel balls 88, and upper bearing race 86 of disc 84 and lower bearing race 80 of mounting portion 64a are radially aligned to rollably receive therebetween a plurality of relatively small diameter steel balls 90.

A ring member 92, corresponding in mean diameter to races 56 and 78, is clamped between mounting portion 38a and mounting portion 64a. Member 92 is formed of hard felt or similar material. The material comprising member 92 preferably has a sandwich construction comprising a core of hard felt bonded top and bottom by polyethylene layers. Such a material is available from Western Felt Works of Chicago, Ill., as Style No. 40-3. Member 92 is provided with a plurality of circumferentially spaced holes receiving balls 88 to maintain the latter in circumferentially spaced relation within races 56, 78. A similar ring member 94, formed of the same material as member 92, serves to space balls 88 within recess 80, 86.

The various swivel base structure elements are maintained in their assembled relationship by a plurality of bolts 96 which pass through aligned holes in mounting portion 38a and disc 84 for threaded engagement with nuts 98. Each bolt and nut assembly also includes a relatively stiff lock washer 100 and a relatively resilient lock washer 102. Nuts 98 are torqued to an extent to firmly clamp the entire assembly and yet allow free swivelling movement of upper platform 40 on lower platform 38. In the clamped relationship, ring members 92, 94 serve to space the associated steel balls, seal the ball races against the entry of grit or other foreign matter, and prevent the escape of lubricant.

Seat bottom 30 is secured to upper platform 40 by four studs 104 which project downwardly from the seat bottom and pass through holes 106 provided at the four corners of the upper face of platform 40. Nuts 107 engage the lower ends of studs 104.

Screw bolts 108 pass through aligned holes in web portion 74 of U channel 72 and reinforcing plates 75 and threadably engage weld nuts 76 to anchor the lower ends of seat belt halves 110a, 110b to swivelling upper platform 40. From their lower anchored ends, seat belt halves 110a, 110b extend upwardly adjacent the rear face of seat bottom 30 and thereafter pass between the upper rear surface of the seat bottom and the lower edge of the seat back where they may be coupled together by an occupant in known manner. The belt halves are held in their upwardly extending position adjacent the rear face of the seat bottom by screws 112 which pass through metallic tabs 114 projecting laterally inwardly from the seat belt halves. Screws 112 pierce the fabric covering of seat bottom 30 and thread into a metal tube 116 forming the rear transverse frame member of the seat bottom.

The described swivel structure thus mounts seat assembly 26 for pivotal movement about a generally vertical axis.

A latching assembly, seen generally at 118, is provided to selectively latch the seat assembly in a generally forwardly facing position or in a generally rearwardly facing position.

Assembly 118 includes an operating lever 120 and a latching lever 122. Operating lever 102 is pivoted on a pin 124 carried on a prong 126 struck from the upper horizontal portion 76a of wing angle bracket 76. Latching lever 122 is pivoted on a screw bolt 130 passing through vertical portion 76b of bracket 76 for threaded engagement with a nut 132 welded to the outboard face of bracket portion 76b. Operating lever 120 includes a handle portion 134, projecting through a slot 136 in cover plate 70, and a depending portion 138 generally in the form of a clevis.

Latching lever 122 is bent downwardly at one end to form a tapered prong portion 122b which passes freely through a slot 140 in mounting portion 64a for wedging, locking engagement with one or the other of a pair of diametrically opposed slots 142, 144 in mounting portion 38a. The other end of latching lever 122 passes through a slot 146 in the bridge or web portion of clevis 138 so that prong portion 122b may be selectively moved into or out of locking engagement with slots 142, 144 by selective manipulation of the handle portion 134 of operating lever 120. A coil spring 148, wound around pivot pin 124 and anchored against prong 126 and clevis 138, acts through clevis 138 to continuously urge prong portion 122b in a downwardly or latching direction. Further details of the construction and operation of latching assembly 118 are disclosed in applicant's copending application Ser. No. 512,351 filed Dec. 8, 1965.

According to an important feature of the present invention, the pivotal axis X of seat assembly 26 is inclined at an angle to the vertical. In the disclosed embodiment, this inclination or tilting of the pivot axis is achieved by disposing mounting portion 38a of lower platform 38 in a position substantially parallel to floor portion 24 so that axis X is substantially normal to floor portion 24. As best seen in FIG. 1, floor portion 24 slopes rearwardly at an angle of approximately four and one-half degrees from the horizontal; axis X, by virtue of its right angle relation to floor portion 24, is thus inclined at an angle of four and one-half degrees from the vertical.

Thus, as the seat assembly is moved from the forwardly facing, dotted line position of FIG. 1 to the rearwardly facing, solid line position of FIG. 1, the entire seat assembly is moved relative to the horizontal through an angle equal to twice the slope of floor portion 24 or, in the disclosed embodiment, through nine degrees.

Thus, whereas seat back 28 in the forwardly facing position of the seat assembly would typically have a rather pronounced rake angle, as illustrated, when the seat assembly is moved to the rearwardly facing position seat back 28 will move upward nine degrees and assume a nearly vertical position. Similarly, whereas the upper support surface of seat bottom 30 in the forwardly facing position of the seat assembly would typically slope rearwardly and downwardly at a rather pronounced angle to the horizontal when the seat assembly is moved to the rearwardly facing position the support surface of seat bottom 30 will tilt downward nine degrees and assume a nearly horizontal position.

This arrangement has several advantages. First, it increases the clearance in the rearwardly facing position between the seat back and the instrument panel and between the occupant's head and the windshield. Second, it allows the seat assembly to be positioned further forwardly on floor portion 24 while yet maintaining specified seat back-to-instrument panel and occupant-to-windshield clearance requirements. Third, as the seat assembly is moved to the rearward facing position, the occupant is automatically moved to a more upright seating position in which he is better situated to use a table assembly T. Table assembly T includes an outer stationary tube 150 fixedly secured to the top wall of the drive shaft tunnel 152, an inner tube 154 telescopically received within outer tube 150 and a board member 156 fixedly secured to the upper end of inner tube 154 to define a generally flat work surface 158 for use by the occupant of the rearwardly facing, generally upright seat assembly. Telescopic movement of tube 150 in tube 156 allows board member 152 to be moved from its upper, solid line position to a lower, dotted line position. It will also be understood that the board member 152 may be swung away from the seat occupant by pivotal movement of member 152 and tube 150 about the central, vertical axis of tubes 146, 150. Further details of the construction and operation of table assembly T are disclosed in applicant's copending United States patent application Ser. No. 517,336 filed Dec. 29, 1965.

While a preferred embodiment of the invention has been illustrated and described in detail, it is to be understood that various changes may be made in the disclosed embodiment without departing from the scope or spirit of the invention as defined by the appended claims.

I claim:
1. A motor vehicle comprising
  (A) a body structure including a passenger compartment having a floor;
  (B) a seat assembly including
    (1) a seat bottom and
    (2) a seat back extending upwardly from said seat bottom at a given rake angle; and
  (C) means mounting said seat assembly for pivotal movement on said floor about a fixed axis inclined at an angle to the vertical, whereby as said seat assembly moves angularly on said axis said rake angle changes at a rate proportionate to the inclination angle of said axis.

2. A motor vehicle according to claim 1 wherein said mounting means mounts said seat assembly for swivelling movement between a generally forwardly facing position and a generally rearwardly facing position, whereby as said seat assembly is moved from one to the other of its said positions said rake angle changes by approximately twice the value of said inclination angle.

3. A motor vehicle according to claim 2 wherein
  (A) said axis is inclined rearwardly with respect to said motor vehicle and
  (B) said seat back slopes rearwardly, with said seat assembly in its forwardly facing position, at a rake angle which is at least twice as great as said inclination angle, whereby as said seat assembly is moved from its forwardly facing position to its rearwardly facing position said rake angle decreases by approximately twice the value of said inclination angle.

4. A motor vehicle according to claim 3
   (A) wherein said motor vehicle includes
      (1) a rear seat
      (2) a front driver's seat and
      (3) a front passenger seat; and
   (B) wherein said seat assembly comprises said front passenger seat.

5. A motor vehicle according to claim 4, and further including a table positioned within said passenger compartment and defining a work surface disposed generally rearwardly of said seat assembly so as to be accessible to an occupant seated in said seat assembly with the latter in its rearwardly facing position.

6. A motor vehicle according to claim 5 wherein said table includes means to selectively adjust the height of said work surface.

7. A motor vehicle according to claim 5 wherein said table includes means to selectively vary the position of said work surface within said motor vehicle.

8. A motor vehicle comprising
   (A) a body structure including a passenger compartment having a floor;
   (B) a seat assembly including
      (1) a seat bottom defining an upper support surface sloping at an angle to the horizontal and
      (2) a seat back extending upwardly from said seat bottom; and
   (C) means mounting said seat assembly for pivotal movement on said floor about a fixed axis inclined at an angle to the vertical, whereby as said seat assembly moves angularly on said axis said slope angle changes at a rate proportionate to the inclination of said axis.

9. A motor vehicle according to claim 8 wherein said mounting means mounts said seat assembly for swivelling movement between a generally forwardly facing position and a generally rearwardly facing position, whereby as said seat assembly is moved from one to the other of its said positions said slope angle changes by approximately twice the value of said inclination angle.

10. A motor vehicle according to claim 9 wherein
    (A) said axis is inclined rearwardly with respect to said motor vehicle and
    (B) said support surface slopes downwardly and rearwardly, with said seat assembly in its forwardly facing position, at a slope angle which is at least twice as great as said inclination angle, whereby as said seat assembly is moved from its forwardly facing position to its rearwardly facing position said slope angle decreases by approximately twice the value of said inclination angle.

11. A motor vehicle according to claim 10
    (A) wherein said motor vehicle includes
       (1) a rear seat
       (2) a front driver's seat, and
       (3) a front passenger seat; and
    (B) wherein said seat assembly comprises said front passenger seat.

References Cited

UNITED STATES PATENTS

| | | | |
|---|---|---|---|
| 1,682,989 | 9/1928 | Smelker | 297—349 |
| 3,013,837 | 12/1961 | Pessl et al. | 296—65 |
| 3,253,856 | 5/1966 | Veda | 297—349 |

LEO FRIAGLIA, *Primary Examiner.*

JAMES H. BRANNEN, *Assistant Examiner.*